(12) United States Patent
Kurita et al.

(10) Patent No.: US 8,387,098 B2
(45) Date of Patent: Feb. 26, 2013

(54) AV CONTENT VIEW SYSTEM

(75) Inventors: Ryo Kurita, Osaka (JP); Takeshi Hatakeyama, Osaka (JP)

(73) Assignee: Panasonic Corporation, Osaka (JP)

( * ) Notice: Subject to any disclaimer, the term of this patent is extended or adjusted under 35 U.S.C. 154(b) by 202 days.

(21) Appl. No.: 12/933,497

(22) PCT Filed: Apr. 16, 2009

(86) PCT No.: PCT/JP2009/001750
§ 371 (c)(1),
(2), (4) Date: Sep. 20, 2010

(87) PCT Pub. No.: WO2009/130864
PCT Pub. Date: Oct. 29, 2009

(65) Prior Publication Data
US 2011/0047580 A1 Feb. 24, 2011

(30) Foreign Application Priority Data
Apr. 21, 2008 (JP) .................. 2008-109795

(51) Int. Cl.
*H04N 7/18* (2006.01)
(52) U.S. Cl. ............... 725/76; 725/75; 725/77
(58) Field of Classification Search .......... None
See application file for complete search history.

(56) References Cited

U.S. PATENT DOCUMENTS

| | | | | |
|---|---|---|---|---|
| 5,953,429 A * | 9/1999 | Wakai et al. | ..... | 381/77 |
| 5,973,722 A * | 10/1999 | Wakai et al. | ..... | 725/76 |
| 7,493,645 B1 * | 2/2009 | Tranchina | ..... | 725/75 |
| 7,636,931 B2 * | 12/2009 | Gatto et al. | ..... | 725/82 |
| 2002/0047900 A1 * | 4/2002 | Nishiyama et al. | ..... | 348/148 |
| 2003/0093798 A1 * | 5/2003 | Rogerson | ..... | 725/75 |
| 2004/0098745 A1 * | 5/2004 | Marston et al. | ..... | 725/73 |
| 2005/0044564 A1 * | 2/2005 | Stopniewicz et al. | ..... | 725/37 |
| 2006/0107295 A1 * | 5/2006 | Margis et al. | ..... | 725/81 |
| 2006/0179457 A1 | 8/2006 | Brady, Jr. et al. | | |
| 2006/0271970 A1 * | 11/2006 | Mitchell et al. | ..... | 725/82 |
| 2007/0250867 A1 * | 10/2007 | Kuwabara et al. | ..... | 725/75 |
| 2007/0250873 A1 | 10/2007 | Ohyama et al. | | |
| 2009/0119721 A1 * | 5/2009 | Perlman et al. | ..... | 725/76 |

FOREIGN PATENT DOCUMENTS

| | | |
|---|---|---|
| JP | 07-143083 | 6/1995 |
| JP | 2006-246297 A | 9/2006 |
| JP | 2007-274019 A | 10/2007 |
| JP | 2008-519506 A | 6/2008 |

OTHER PUBLICATIONS

International Search Report for International Application No. PCT/JP2009/001750, Jun. 9, 2009, Panasonic Corporation.
Apple Teams Up With Air France, Continental, Delta, Emirates, KLM & United to Deliver Ipod Integration, Apple Inc., Nov. 14, 2006, Retrieved from the Internet: <URL: http://www.apple.com/pr/library/2006/nov/14ipod.html>.

* cited by examiner

*Primary Examiner* — Brian Pendleton
*Assistant Examiner* — Jason K Lin
(74) *Attorney, Agent, or Firm* — RatnerPrestia

(57) ABSTRACT

In video/audio information such as a movie in a mobile terminal connected to a terminal of a seat terminal for a mobile terminal, the video is converted into video data and transmitted to a seat terminal of a front seat via a transmission path. The video data are decoded by a video decoder of the seat terminal of the front seat and displayed on a video display section. Furthermore, audio is listened to by a user via a headphone of the user's own seat.

14 Claims, 4 Drawing Sheets

AV CONTENT VIEW SYSTEM

This Application is a U.S. National Phase Application of PCT International Application PCT/JP2009/001750.

TECHNICAL FIELD

The present invention relates to an AV content view system for viewing and listening to AV (audio/visual) software such as movies and music, game software, or the like, which is installed and disposed in each seat in a cabin of passenger vehicles such as an aircraft.

BACKGROUND ART

Recently, in passenger vehicles such as an aircraft, various in-flight services are provided to passengers by an in-flight entertainment system called IFE (In-Flight Entertainment), which is installed and disposed in an aircraft or in a cabin. When passengers use such in-flight services, for example, the passengers can view and listen to distributed movies or music by using a video display section of a liquid crystal display device or a headphone handed out when they board the aircraft. Furthermore, similarly, by using an operating terminal called a handset provided in each seat, passengers can play a game, make a phone call to the outside of the aircraft, and receive connection services to the Internet (see, for example, Patent Documents 1 and 2). Such services are transmitted as digital data via a network transmission path from an AV server set in an aircraft to a seat terminal (IFE) provided in each seat.

Hereinafter, a conventional AV content view system in an aircraft is described with reference to FIG. 5. FIG. 5 is a view showing an entire configuration of conventional AV content view system 200.

In AV content view system 200, network transmission path 2 is laid out along a plurality of seats 1$m$ and 1$n$. Network transmission path (hereinafter, referred to as "transmission path") 2 is connected to AV server 3. AV server 3 provides AV content including video and audio content, for example, movies and games. Furthermore, AV server 3 can provide flight information and the like, if necessary.

Transmission path 2 is made of Ethernet (trade mark) cable. To transmission path 2, seat terminals 14$m$ and 14$n$ are connected for each seat. Furthermore, video display section 6$m$, 6$n$ such as a liquid crystal display is set on the back part of each seat, and controller 5$m$, 5$n$ and headphone 7$m$, 7$n$ are connected to the front part of the seat. These devices are connected communicably to the above-mentioned AV server 3 via seat terminals 14$m$ and 14$n$.

Furthermore, microphone 8$a$ in crew's cabin 8 is connected to transmission path 2 via IP (Internet Protocol) adaptor 8$b$ configured to convert an analog audio signal into a digital audio packet and to connect it to the Ethernet (trade mark).

A microphone similar to microphone 8$a$ is equipped in a cockpit (not shown), and cabin attendants and an airline captain make an in-flight announcement to passengers by using the microphone.

In such a configuration, when, for example, a passenger seated in seat 1$m$ selects a movie which he/she wants to watch by operating controller 5$m$, video and audio of the movie are downloaded and stored in seat terminal 14$n$ of seat 1$n$ in front of the passenger from AV server 3 (a plurality of pieces of content may be stored in a seat terminal in advance).

Video of a movie selected by a passenger is displayed on video display section 6$n$ of front seat 1$n$, and audio is transmitted as digital data (audio packet) to seat terminal 14$m$ behind seat terminal 14$n$ via transmission path 2 and demodulated into an original analog audio signal in seat terminal 14$m$. A passenger can listen to the analog audio by headphone 7$m$.

The above-mentioned in-flight announcement from cabin attendants or an airline captain can be listened to by headphone 7$m$ via seat terminal 14$m$ of seat 1$m$. The in-flight announcement can be also listened to from a loudspeaker provided on the ceiling. However, a passenger using headphone 7$m$ for a movie and the like cannot listen to the announcement from the loudspeaker. Therefore, the in-flight announcement is transmitted to seat terminal 14$m$ via transmission path 2, and the audio of the movie is automatically switched to the in-flight announcement in the seat terminal, so that the in-flight announcement can be listened to by head phone 7$m$.

However, with the above-mentioned conventional AV content view system in an aircraft, passengers can receive only services of the AV content contained in AV server 3. Since there is a limit to the containing capacity of AV server 3, passengers using AV services repeatedly do not have content to be appreciated, or some passengers may not interested in the content.

Recently, portable terminals with which users can enjoy video and audio outside or in a mobile unit are being popularized. In a storage section (a hard disk or a semiconductor memory) of such a portable terminal, compressed data of AV content have been stored in advance. For example, users carry their portable terminals to the outside after they downloaded desired AV content into their portable terminals from PC and the like.

When passengers use such portable terminals in an aircraft, since the passengers use headphones attached to the portable terminals, they may miss in-flight announcement. Furthermore, although a large liquid crystal display for viewing AV services is equipped in front of the passengers, the passengers cannot use such a display and inconveniently watch video in a small screen of the portable terminal.

[Patent Document 1] Japanese Patent Application Unexamined Publication No. H7-143083
[Patent Document 2] Japanese Patent Application Unexamined Publication No. 2006-246297

SUMMARY OF THE INVENTION

An AV content view system of the present invention includes: an AV server storing AV content including compressed video data and audio data for distribution; a plurality of seats arranged back and forth and each having a video display section on a back part thereof; seat terminals set in each of the seats, connected to the AV server via a transmission path, and incorporating a video/audio storage section that stores the distributed AV content and a video decoder; and an audio output section connected to the seat terminal. When a passenger selects predetermined AV content, the predetermined AV content is distributed from the AV server to the seat terminal of a passenger's own seat seated by the passenger via the transmission path, and based on an instruction of the passenger, the AV content is read out from the video/audio storage section of the seat terminal of the passenger's own seat, the compressed video data of the AV content is transmitted to the seat terminal of a front seat via the transmission path, decoded by the video decoder, and displayed on the video display section, and the audio data of the AV content are output from the audio output section of the passenger's own seat. The seat includes an input terminal for taking in a video signal and an audio signal into the seat terminal from the portable terminal. The audio signal taken in from the input terminal is output to the audio output section of the passenger's own seat, and the video signal taken in from the input terminal is converted into video data in the seat terminal of the passenger's own seat, and transmitted to the seat terminal of the front seat via the transmission path, and displayed on the video display section.

With such a configuration, the AV content from portable terminal can be viewed by operating the existing AV services system and by effectively using the equipped apparatus, and the service content can be extended. In particular, a passenger can watch video of the portable terminal on a large display of the front seat.

REFERENCE MARKS IN THE DRAWINGS

Figure 1:
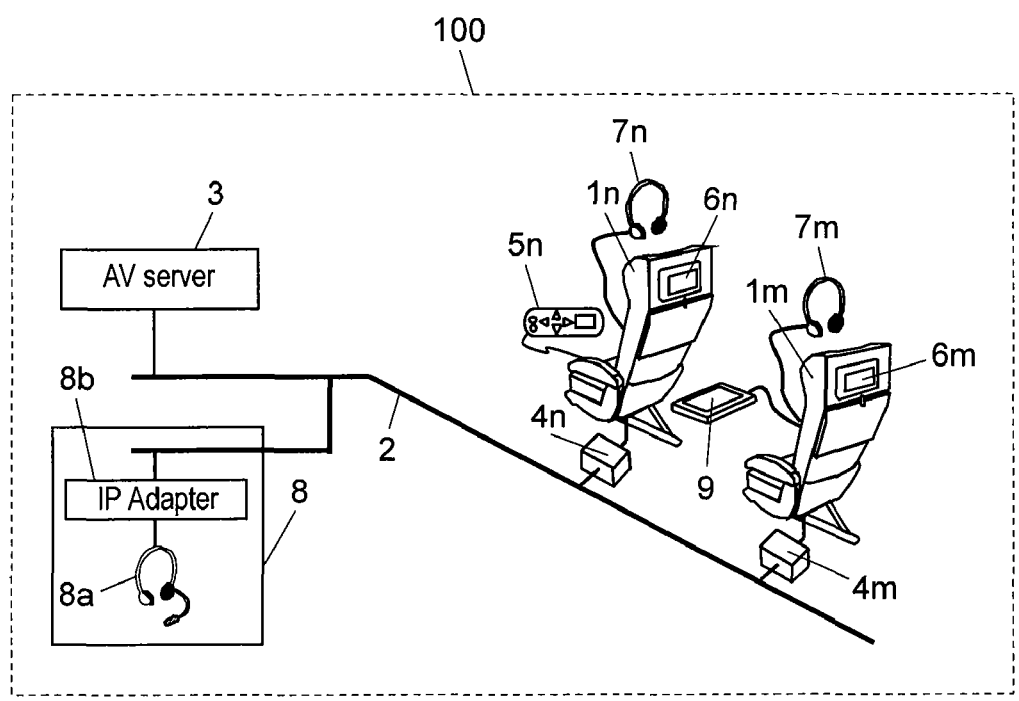
FIG. 1 is a view showing an entire configuration of an AV content view system in accordance with an exemplary embodiment of the present invention.

1*m*, 1*n* seat
2 transmission path (network transmission path)
3 AV server
4*m*, 4*n*, 14*m*, 14*n* seat terminal
5*m*, 5*n* controller
6*m*, 6*n*, 60 video display section
7*m*, 7*n* headphone
8 crew's cabin
8*a* microphone
9 portable terminal
40 bus
41 CPU (central processing unit)
42 ROM
43 video/audio storage section
44 video decoder
45 audio decoder
45*a* headphone terminal
46 controller interface
47 encoder
48 external interface
48*a* terminal for portable terminal (input terminal)
49 network interface
50 video synthesizing section
61 video
62 course map
100, 200 AV content view system

DETAILED DESCRIPTION OF THE PREFERRED EMBODIMENT

Hereinafter, an exemplary embodiment of the present invention is described with reference to drawings.

Exemplary Embodiment

The exemplary embodiment is described with reference to FIG. 1 by using FIGS. 2 to 3.

FIG. 1 is a view showing an entire configuration of AV content view system 100 in accordance with this exemplary embodiment. The external appearance configuration of AV content view system 100 of this exemplary embodiment is different from conventional AV content view system 200 in that portable terminal 9 is newly added to AV content view system 100. Furthermore, by adding portable terminal 9, an internal configuration of seat terminals 14*m* and 14*n* is partly changed. Since the configurations of the other parts are the same as those in conventional AV content view system 200, the same references are given to the same configurations and the description thereof is omitted.

Figure 2:
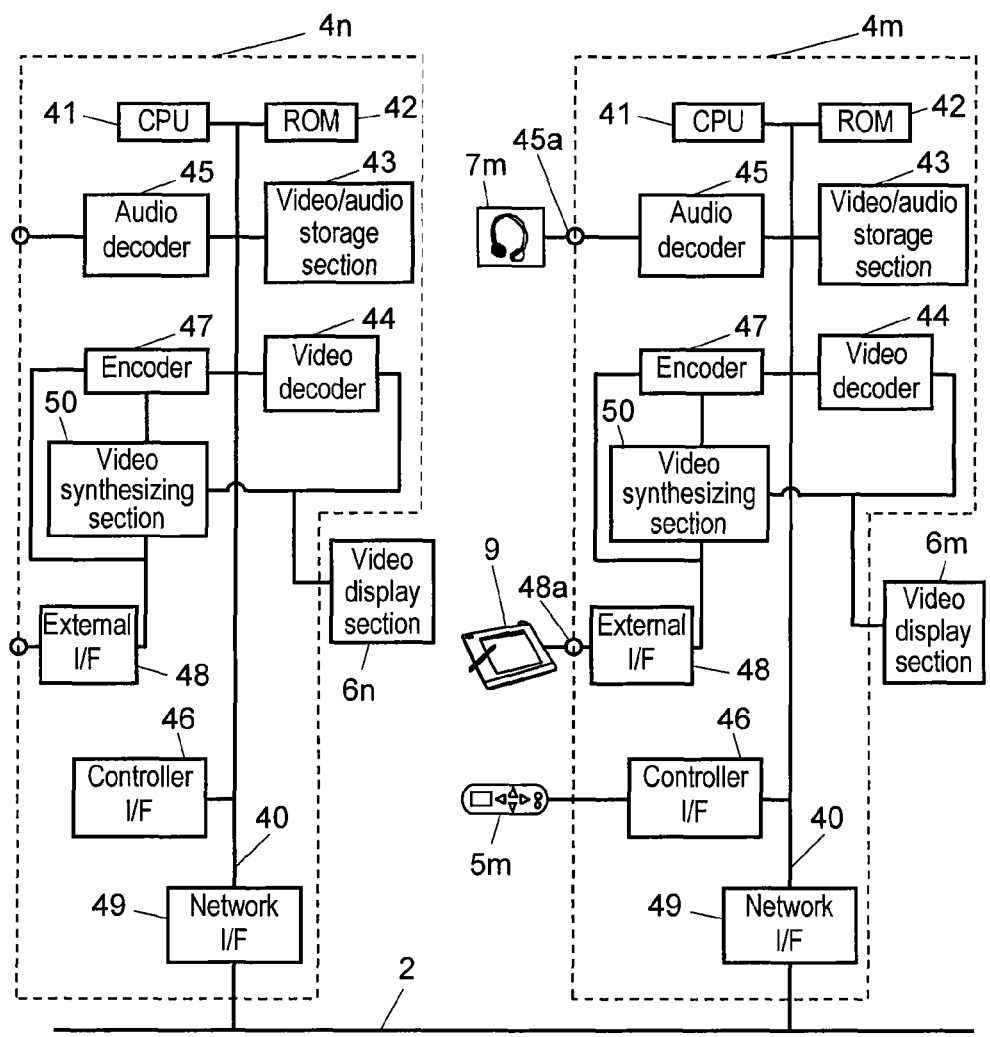
FIG. 2 is a view showing a main configuration of an AV content view system in accordance with an exemplary embodiment of the present invention.

FIG. 2 is a view showing a main configuration of AV content view system 100 in accordance with this exemplary embodiment. FIG. 2 shows a block diagram showing a configuration of seat terminals 4*m* and 4*n* placed in seats 1*m* and 1*n* shown in FIG. 1 and the periphery thereof. Seat terminals 4*n* (a front seat) and 4*m* (a passenger's own seat) connected to transmission path 2 are shown by a broken line frame.

CPU 41 is a central processing unit such as a microcomputer for controlling the entire seat terminal. The below-mentioned components including CPU 41 are connected to bus 40 as shown in FIG. 2, so that information is mutually exchanged. A program of CPU 41 is stored in ROM 42.

Video/audio storage section 43 stores compressed video data and compressed audio data compressed by, for example, MPEG (Moving Picture Experts Group) 2 downloaded from AV server 3 via transmission path 2.

Video decoder 44 and audio decoder 45 are decoders for decoding and reproducing the compressed video data and compressed audio data stored in video/audio storage section 43.

The above-mentioned video display section 6*m* is connected to video decoder 44. Headphone 7*m* as the above-mentioned audio output section is connected to audio decoder 45 via headphone terminal 45*a*.

Note here that in-flight announcement transmitted from an airline captain, cabin attendants, or the like, via the above-mentioned transmission path 2 is taken in seat terminal 4*m* and listened to by headphone 7*m*.

Controller interface 46 sends a command based on an operation of controller 5*m* connected to controller interface 46 to bus 40.

Encoder 47 compresses a video signal and an audio signal taken in from portable terminal 9 via external interface 48 into the compressed data that are the same as the compressed video data and compressed audio data of MPEG2 and the like, and sends them to bus 40.

Network interface 49 is an interface with transmission path 2, and has an inherent address (for example, MAC address) for identifying seat terminals.

Figure 3:
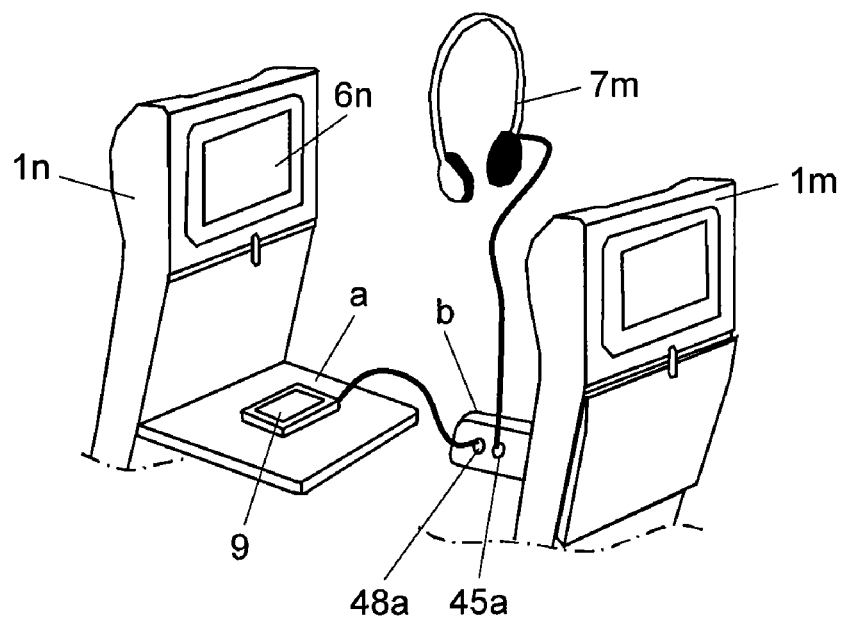
FIG. 3 is an external appearance diagram showing a detail of a seat part of an AV content view system in accordance with an exemplary embodiment of the present invention.

Portable terminal 9, as shown in FIG. 3, is put on, for example, table a of the seat and connected to terminal for portable terminal 48*a* provided in armrest part b. Headphone 7*m* is similarly connected to headphone terminal 45*a*.

Video synthesizing section 50 synthesizes a video signal taken in from portable terminal 9 via external interface 48 and a video signal output from video decoder 44. Thus, passengers can synthesize video such as a movie of portable terminal 9 and video (including an image such as a map) sent from the AV server by video display section 6*n* and watch them simultaneously. This function is described in detail later.

Next, in such a configuration, an operation of AV content view system 100 of this exemplary embodiment is described.

Firstly, a case in which a passenger views and listens to AV content stored in AV server 3 is described. When a passenger selects AV content by operating controller 5m of the passenger's own seat, selection information is sent to AV server 3 via transmission path 2, the AV content is distributed from AV server 3 to seat terminal 4m of the passenger's own seat (seat 1m) and once stored in internal video/audio storage section 43. In conventional AV content view system 200, distributed AV content is stored in seat terminal 4n in the front seat, which is different from this exemplary embodiment in this part.

Next, when a passenger operates controller 5m to instruct reproduction, compressed video data stored in video/audio storage section 43 are sent to seat terminal 4n of the front seat via network interface 49 and transmission path 2. In the seat terminal 4n of the front seat, the compressed video data taken therein are decoded by video decoder 44 and displayed on video display section 6n.

On the other hand, the selected compressed audio data are decoded by audio decoder 45 in seat terminal 4m of the passenger's own seat, and then listened to as audio by headphone 7m of the passenger's own seat.

In this case, since displaying of the video is delayed by a time during which the compressed video data are transmitted in transmission path 2, the timing at which the compressed audio data are read out from video/audio storage section 43 of seat terminal 4m of the passenger's own seat is made to be delayed by the above-mentioned time. Thus, synchronization with video is established. A method for establishing synchronization with video is not necessarily limited to this method. Compressed video and audio data are read out simultaneously, and delay circuit is added so as to delay only the audio. Furthermore, video and audio data are reproduced in a state in which a time stamp is inserted in the video and audio data, and a delay amount is controlled based on this time stamp. In this case, more precise synchronization can be established.

Next, a case in which AV content of portable terminal 9 is viewed and listened to is described. Herein, a case in which an output of portable terminal 9 is an analog signal is described.

A passenger connects an output cord of portable terminal 9 to terminal for portable terminal 48a as an input terminal so as to operate portable terminal 9, selects favorite AV content, and presses a play button. Video and audio signals taken in external interface 48 are compressed by encoder 47 into compressed data having the same format as those of the compressed video data and compressed audio data stored in video/audio storage section 43 in the AV services. Thereafter, the compressed audio data are decoded as audio in audio decoder 45 and output from headphone 7m.

On the other hand, the compressed video data are sent to seat terminal 4n of the front seat via network interface 49 and transmission path 2. In seat terminal 4n of the front seat, the taken compressed video data are decoded by video decoder 44 and displayed on video display section 6n.

Also in this case, similar to the case in which AV content stored in AV server 3 is viewed and listened to, since displaying of the video is delayed by a time during which the compressed video data are transmitted in transmission path 2, audio in the passenger's own seat is made to be delayed so as to establish synchronization with video.

Furthermore, as mentioned above, a passenger can watch video such as a movie that is being reproduced in portable terminal 9 and video of AV content sent from AV server 3 or an image including flight information by synthesizing them by video synthesizing section 50 of seat terminal 4m. That is to say, the video synthesized in video synthesizing section 50 of seat terminal 4m is converted into compressed video data by encoder 47, transmitted to seat terminal 4n via transmission path 2, decoded by video decoder 44 and displayed on video display section 6n.

Figure 4:
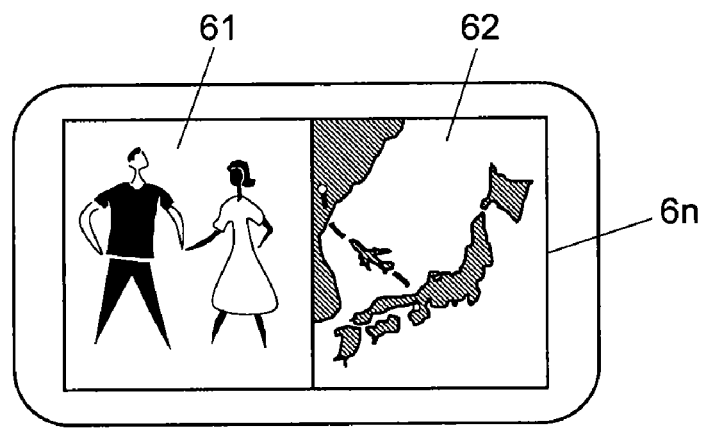
FIG. 4 is a view showing an example of a case in which video that is synthesized in a video synthesizing section of an AV content view system is displayed on a video display section in accordance with an exemplary embodiment of the present invention.
Figure 5:
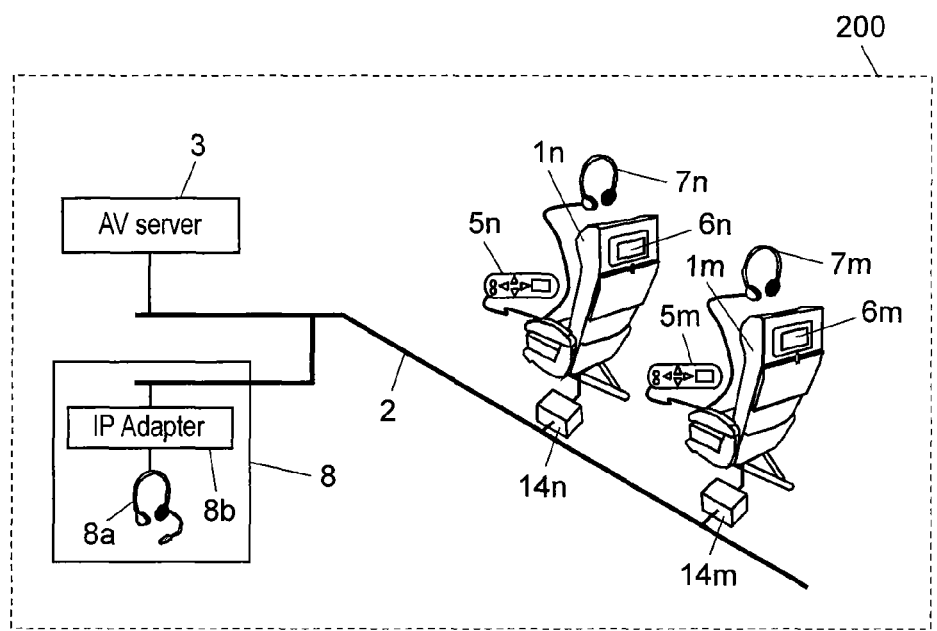
FIG. 5 is a view showing an entire configuration of a conventional AV content view system.

FIG. 4 shows an example of a case in which video synthesized by video synthesizing section 50 is displayed on video display section 6n. In FIG. 4, video 61 from portable terminal 9 is displayed on the left side of video display section 6n, and course map 62 showing a flight state of the aircraft on the right side of the screen. In this way, passengers can view and listen to two pieces of information on one screen of video display section 6n. Thus, passengers can enjoy content such as a movie of portable terminal 9 while they can get flight information.

Note here that passengers may set video display section 6n to one screen or two screens by using controller 5m. In an emergency, pilots or cabin attendants may set the display forcedly. Furthermore, FIG. 4 shows just one example of a method of displaying video in a two-screen mode, and any methods may be employed as long as two kinds of video can be displayed in a two-screen mode on the same display screen.

Furthermore, since still video information such as a map includes a small amount of data, it is not necessarily compressed when it is stored in an AV server. The transmitted image may be synthesized in video synthesizing section 50 as it is.

As mentioned above, in the exemplary embodiment, a terminal for taking in content of portable terminal 9 is provided in seat terminal 4m, and an encoder for converting the taken video signal and audio signal into compressed video data and compressed audio data that are in the same compression format as those provided from AV server 3. Therefore, passengers can view and listen to both the content of AV server 3 and the content of portable terminal 9 by decoding them by video decoder 44 in seat terminal 4n.

Furthermore, passengers can watch video of portable terminal 9 on a large display on the front seat.

Furthermore, passengers can view both video of portable terminal 9 and video distributed from AV server 3 simultaneously by displaying them on the display of the front seat in a two-screen mode.

Furthermore, when passengers view and listen to content of portable terminal 9, they do not miss in-flight announcement similar to the case in which they view and listen to content of AV server 3.

Note here that in the above-mentioned exemplary embodiment, an audio signal from portable terminal 9 is compressed similar to the AV services. However, switching of an audio signal may be carried out after audio decoder 45, and compression may not be carried out.

Furthermore, in the above-mentioned exemplary embodiment, a signal from portable terminal 9 is an analog signal, but it may be taken in as a digital signal. Furthermore, the signal may be taken in directly into a seat terminal in a state of compressed data stored in a storage section inside portable terminal 9. In this case, video data may be compressed again to allow the same compression format to be the same as that of AV services.

Furthermore, in the above-mentioned exemplary embodiment, video data taken in the seat terminal are compressed in the same compression format as that of AV services. However, compression is carried out in a state in which the compression rate is further increased. Thus, when video data are transmitted to seat terminal 4*n* of the front seat from seat terminal 4*m* of the passenger's own seat, the transmission band can be further reduced.

Furthermore, the above-mentioned exemplary embodiment shows a configuration in which a passenger selects AV content to be viewed by using controller 5*m* connected to seat terminal 4*m* of the passenger's own seat. However, a passenger may select content by touching a menu screen displayed on video display section 6*n* set on the back part of the front seat. In this case, selection information is transmitted to AV server 3 via seat terminal 4*n* of the front seat.

Furthermore, in the above-mentioned exemplary embodiment, audio of the distributed AV content or audio taken in from portable terminal 9 is listened to by a passenger via headphone 7*m* connected to seat terminal 4*m* of the passenger's own seat. However, a passenger may listen to the audio by an audio output device other than a headphone, for example, a loudspeaker.

Furthermore, passengers may bring their portable terminals for their own, or an airline company may lend them to passengers who want.

INDUSTRIAL APPLICABILITY

An AV content view system of the present invention can be used in public transportation including vehicles such as buses and trains, ships such as ferries and passenger ship, and the like.

The invention claimed is:

1. An AV content view system, comprising:
an AV server storing AV content for distribution, the AV content including compressed video data and audio data;
a plurality of seats arranged back and forth and each having a video display section on a back part thereof;
seat terminals set in each of the seats, connected to the AV server via a transmission path, and incorporating a video/audio storage section that stores the distributed AV content and a video decoder; and
an audio output section connected to the seat terminal,
wherein when a passenger selects predetermined AV content, the predetermined AV content is distributed from the AV server to the seat terminal of a passenger's own seat seated by the passenger via the transmission path, and based on an instruction of the passenger, the AV content is read out from the video/audio storage section of the seat terminal of the passenger's own seat, the compressed video data of the AV content is transmitted to the seat terminal of a seat in front of the passenger's own seat via the transmission path, decoded by the video decoder, and displayed on the video display section, and the audio data of the AV content are output from the audio output section of the passenger's own seat;
each the passenger's own seat includes an input terminal for receiving a video signal and an audio signal from a portable terminal, wherein the received video signal and audio signal is transferred to the respective seat terminal of the passenger's own seat,
the audio signal received from the input terminal located at the passenger's own seat is output to the audio output section of the passenger's own seat, and the video signal received from the input terminal located at the passenger's own seat is converted into video data in the seat terminal of the passenger's own seat, and transmitted to the seat terminal of the seat in front of the passenger's own seat via the transmission path, and displayed on the video display section located in front of the passenger's own seat, and wherein the seat terminal of the passenger's own seat includes a video synthesizing section for synthesizing the video signal received from the input terminal and the video data distributed from the AV server, further allowing one or more users of the AV server having permission to override the synthesized video data and video signal to display information on the video display section located in front of the passenger's own seat.

2. The AV content view system of claim 1,
wherein the seat terminal further includes an encoder for compressing a video signal,
the video signal taken in from the input terminal is compressed by the encoder, and the compressed video data are transmitted to the seat terminal of the front seat via the transmission path and decoded by the seat terminal and displayed on the video display section.

3. The AV content view system of claim 2,
wherein the encoder compresses the video signal taken in from the input terminal in a same compression format as that of the compressed video data stored in the AV server.

4. The AV content view system of claim 1,
wherein the video data synthesized in the video synthesizing section are compressed by the encoder, the compressed video data are transmitted to the seat terminal of a front seat via the transmission path, decoded by the seat terminal, and displayed on the video display section in a two-screen display mode.

5. The AV content view system of claim 1,
wherein the audio data are made to be delayed by the seat terminal of the passenger's own seat such that video displayed on the video display section and audio output from the audio output section are synchronized.

6. The AV content view system of claim 1,
wherein the seat terminal performs output to the audio output section by switching between the audio transmitted from the transmission path and the audio taken in from the portable terminal.

7. The AV content view system of claim 6,
wherein the AV content view system is installed in an aircraft, and the audio transmitted via the transmission path is an in-flight announcement.

8. The AV content view system of claim 2,
wherein the audio data are made to be delayed by the seat terminal of the passenger's own seat such that video displayed on the video display section and audio output from the audio output section are synchronized.

9. The AV content view system of claim 3,
wherein the audio data are made to be delayed by the seat terminal of the passenger's own seat such that video displayed on the video display section and audio output from the audio output section are synchronized.

10. The AV content view system of claim 4,
wherein the audio data are made to be delayed by the seat terminal of the passenger's own seat such that video displayed on the video display section and audio output from the audio output section are synchronized.

11. The AV content view system of claim 2,
wherein the seat terminal performs output to the audio output section by switching between the audio transmitted from the transmission path and the audio taken in from the portable terminal.

12. The AV content view system of claim 3,
wherein the seat terminal performs output to the audio output section by switching between the audio transmitted from the transmission path and the audio taken in from the portable terminal.

13. The AV content view system of claim 4, wherein the seat terminal performs output to the audio output section by switching between the audio transmitted from the transmission path and the audio taken in from the portable terminal.

14. The AV content view system of claim 5, wherein the seat terminal performs output to the audio output section by switching between the audio transmitted from the transmission path and the audio taken in from the portable terminal.

\* \* \* \* \*